United States Patent
Doi et al.

(10) Patent No.: US 8,542,213 B2
(45) Date of Patent: Sep. 24, 2013

(54) TOUCHED POSITION DETECTION METHOD FOR TOUCH PANEL

(75) Inventors: Koji Doi, Yokohama (JP); Norio Mamba, Kawasaki (JP); Koji Nagata, Hachioji (JP); Toshiyuki Kumagai, Chigasaki (JP); Koji Hayakawa, Chosei-gun (JP); Toshiaki Atsuta, Yokoshibahikari (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 1111 days.

(21) Appl. No.: 12/496,804

(22) Filed: Jul. 2, 2009

(65) Prior Publication Data

US 2010/0060609 A1    Mar. 11, 2010

(30) Foreign Application Priority Data

Sep. 8, 2008    (JP) .................................. 2008-229236

(51) Int. Cl.
    *G06F 3/041*    (2006.01)
(52) U.S. Cl.
    USPC .......................................................... 345/174

(58) Field of Classification Search
    USPC .............. 345/156, 173, 174, 177; 178/18.06; 324/686
    See application file for complete search history.

(56) References Cited

U.S. PATENT DOCUMENTS

| 5,386,219 | A  | * | 1/1995 | Greanias et al. ............... 345/174 |
| 5,841,078 | A  | * | 11/1998 | Miller et al. ................ 178/18.06 |
| 2002/0039092 | A1 | * | 4/2002 | Shigetaka ...................... 345/156 |
| 2005/0146512 | A1 | * | 7/2005 | Hill et al. ....................... 345/173 |
| 2007/0165009 | A1 | * | 7/2007 | Sakurai et al. ................ 345/177 |
| 2009/0045822 | A1 | * | 2/2009 | Nosovitsky et al. .......... 324/686 |

FOREIGN PATENT DOCUMENTS

JP          2007-026065          2/2007

* cited by examiner

*Primary Examiner* — Chanh Nguyen
*Assistant Examiner* — James Nokham
(74) *Attorney, Agent, or Firm* — Antonelli, Terry, Stout & Kraus, LLP.

(57) ABSTRACT

In a touched position detection method for a touch panel for detecting a touched position, based on measured values by a plurality of sensors, presence of a touch is determined when a measured value by a sensor exceeds a touch threshold. As a touch threshold, a value which cannot be attained due to a mere noise but can due to presence of a touch is set. With respect to sensors located in the vicinity of a sensor showing a high measured value, a higher weighted value is applied to modify a measured value in a touched position calculation process than that to be applied to other sensors.

6 Claims, 6 Drawing Sheets

TOUCHED POSITION DETECTION METHOD FOR TOUCH PANEL

CROSS-REFERENCE TO RELATED APPLICATION

The present application claims priority from Japanese application JP2008-229236 filed on Sep. 8, 2008, the content of which is hereby incorporated by reference into this application.

BACKGROUND OF THE INVENTION

1. Field of the Invention

The present invention relates to a touch panel, and in particular to a method for detecting a touched position on a projected capacitive static capacitance type touch panel.

2. Description of the Related Art

In recent years, touch panels have become popular to be used as a user interface of a mobile device.

As one type of a touch panel, a static capacitance type is available. This type has come to be used in a wider market as being superior in transmittance and durability, though having a noise problem to be addressed. A touch panel, as being adhesively attached to a display screen, is likely affected by noise due to a display driving circuit. Accordingly, problems may be caused due to noise, including erroneous detection of a touch when the touch panel is not touched at all, difference between a calculated touched position and an actual touched position, and so forth.

As an example of a technique for reducing noise influence on a static capacitance type touch panel, Japanese Patent Laid-open Publication No. 2007-26065 discloses a touch detection method. According to this touch detection method, presence of a touch is determined when a measured value by a touch detection sensor is maintained equal to or larger than a predetermined threshold for a period longer than a predetermined period. This can avoid erroneous touch detection due to noise which appears only for a short period.

However, the method disclosed in the above described Japanese Patent Laid-open Publication No. 2007-26065 has some problems. First, as elapse of a predetermined period of time after a touch begins is needed to detect a touch, detection of a quick touch by a user (instantaneous touch, or the like) may be failed. Second, there is a possibility that a calculated position be different from an actual touched position as noise influence is not taken into consideration in a touched position calculation process following touch detection.

SUMMARY OF THE INVENTION

The present invention has been conceived in order to solve the above-described problems, and an object thereof is to provide a touch panel capable of detecting a touch in a short period and calculating a touched position with high accuracy, while preventing erroneous touch detection, under circumstances where noise will be caused.

According to a touched position detection method for a touch panel according to the present invention, presence of a touch is determined when a measured value by a sensor exceeds a touch threshold. As a touch threshold, a value which cannot be attained due to a mere noise but can due to presence of a touch is set. With respect to sensors located in the vicinity of a sensor showing a high measured value, a higher weighted value is applied to modify a measured value in a touched position calculation process than that to be applied to other sensors.

As presence or absence of a touch can be determined, based on a single measured value by a sensor, a quick operation by a user can be detected. Further, as a measured value by a sensor located near a touched position is made much of in calculation of a touched position, remarkable displacement of a calculated touched position from an actual touched position due to noise influence can be avoided.

By implementing the touched position detection method according to the present invention through software process, it is possible to address a noise problem without increasing hardware cost.

DETAILED DESCRIPTION OF THE INVENTION

In the following, an embodiment for describing the present invention will be described.

Embodiment 1

Figure 1:
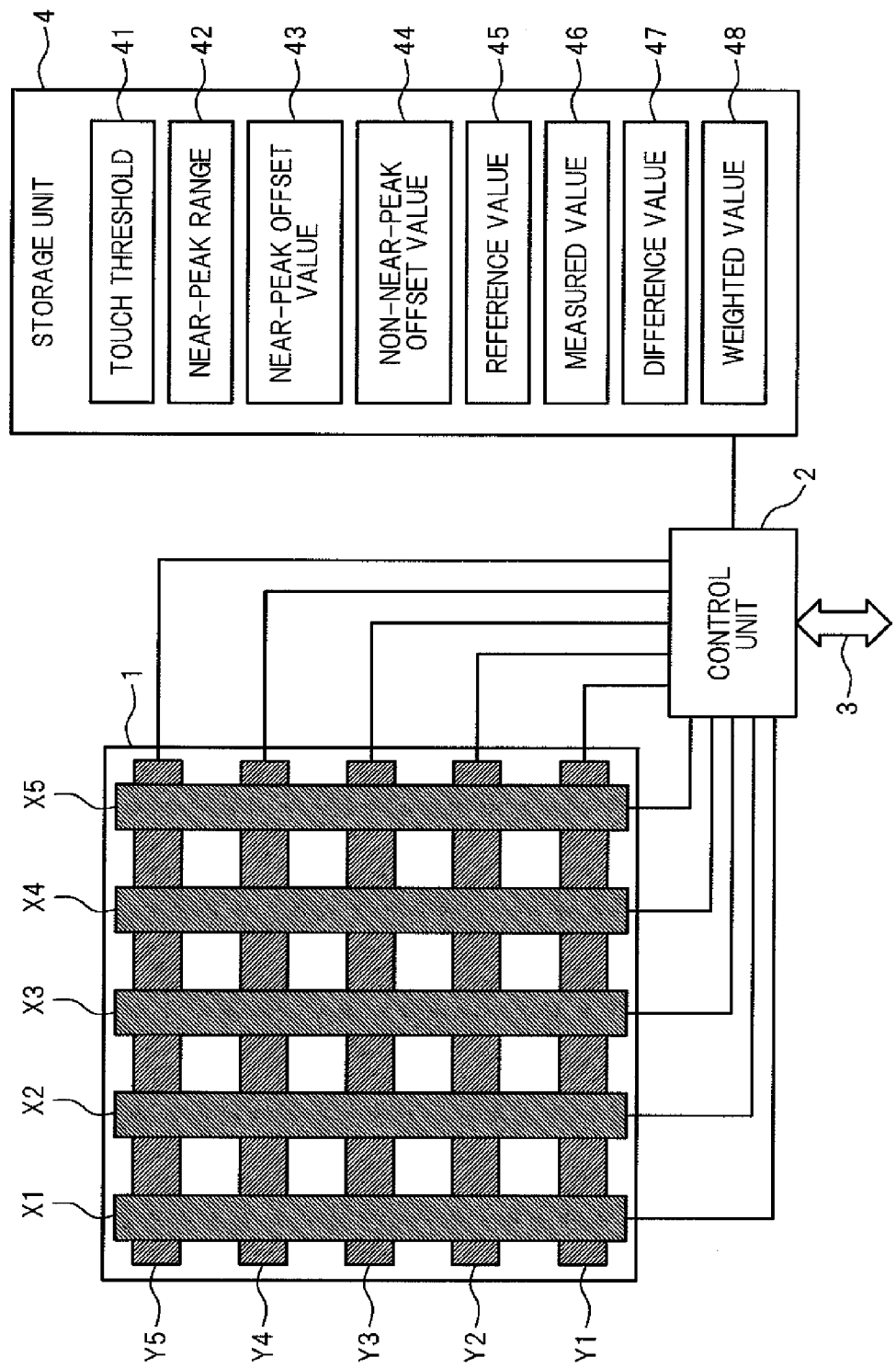
FIG. 1 is a block diagram showing a structure of a touch panel module.

FIG. 1 is a block diagram showing a structure of a touch panel module used in this embodiment. The touch panel module comprises a touch panel 1, a control unit 2, a bus connection signal line 3, and a storage unit 4. In the touch panel 1, electrode patterns (electrodes X1 to X5 and Y1 to Y5) which are sensor terminals for detecting a touch by a user are formed. The control unit 2 is connected to the electrodes X1 to X5 and Y1 to Y5, and measures static capacitance of each electrode. The control unit 2 detects a touched position, based on the measured static capacitance, and notifies a host of the result via the bus connection signal line 3. The storage unit 4 stores a parameter and working data necessary in a touched position detection process by the control unit 2. The parameter comprises a touch threshold 41, a near-peak range 42, a near-peak offset value 43, and a non-near-peak offset value 44, each being a numeric value. The working data comprises a reference value 45, a measured value 46, a difference value 47, and a weighted value 48, each being an array of numeric values. The number of elements of each array is equal to the number of electrodes, which is ten in this embodiment.

Figure 2:
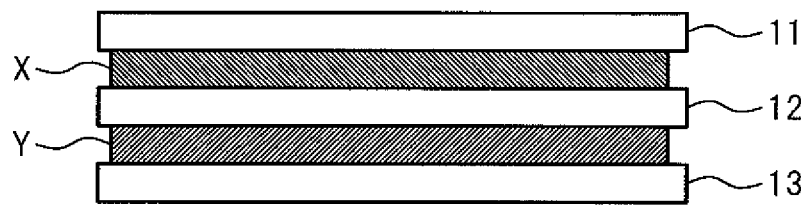
FIG. 2 is a cross sectional view showing a cross sectional structure of a touch panel.

FIG. 2 is a cross sectional view showing a cross sectional structure of the touch panel 1. The touch panel 1 has a structure in which an electrode layer Y, an insulation layer 12, an electrode layer X, and a protection layer 11 are stacked in this order on a substrate layer 13 serving as a bottom surface. Note that by mounting the layers each formed using a transparent member on a flat display, a display having a touch panel can be formed.

Figure 3:
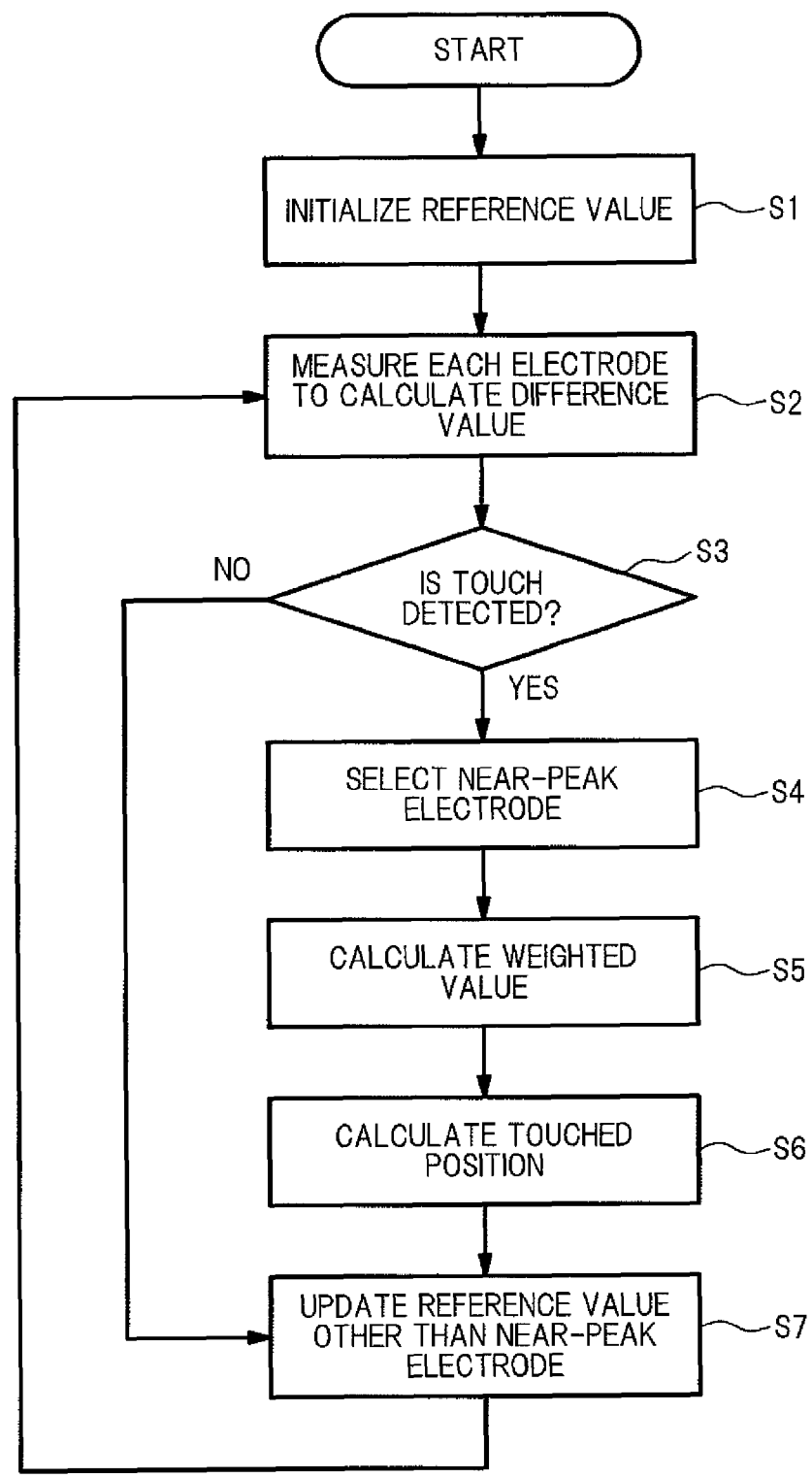
FIG. 3 is a flowchart of a procedure of a touched position detection process to be carried out by a control unit.

FIG. 3 is a flowchart showing a procedure of a touched position detection process to be carried out by the control unit 2.

Figure 4:
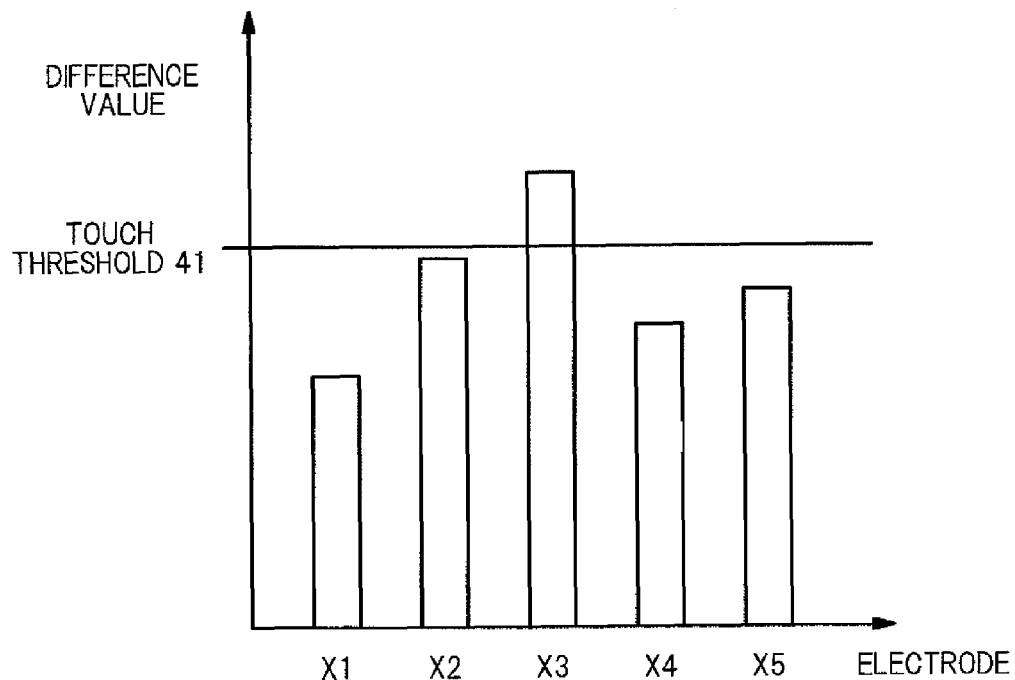
FIG. 4 is a graph showing an example of a difference value for describing a touch detection process.

FIG. 4 is a graph showing an example of the difference value 45 for describing a touch detection process.

Figure 5:
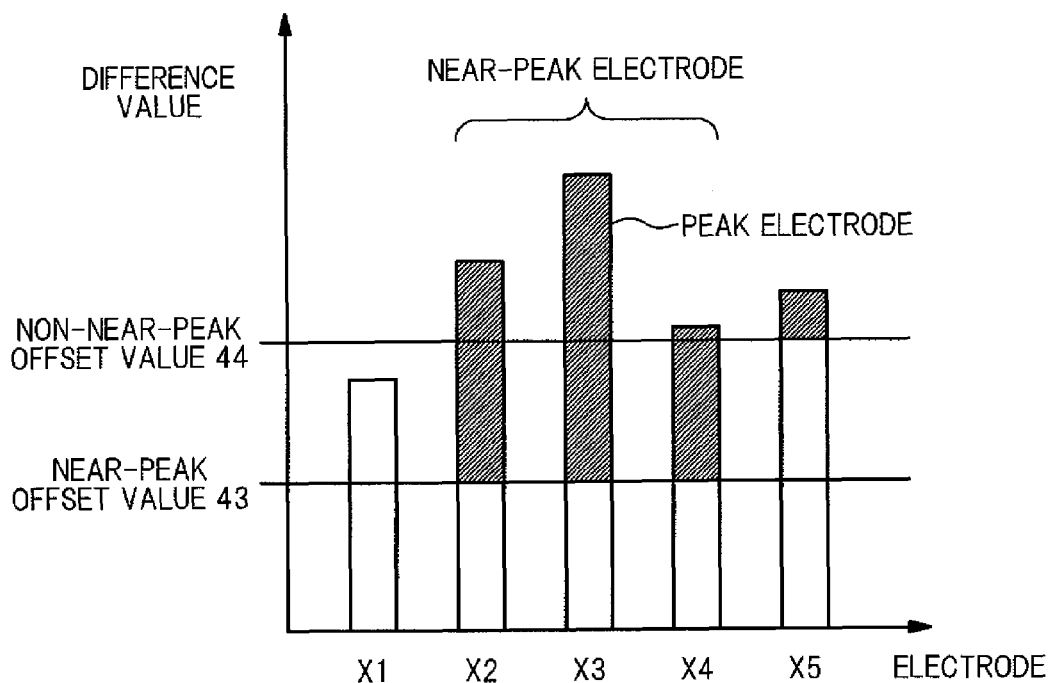
FIG. 5 is a graph showing an example of a difference value for describing a touched position calculation process.

FIG. 5 is a graph showing an example of the difference value 45 for describing a touched position calculation process.

Figure 6:
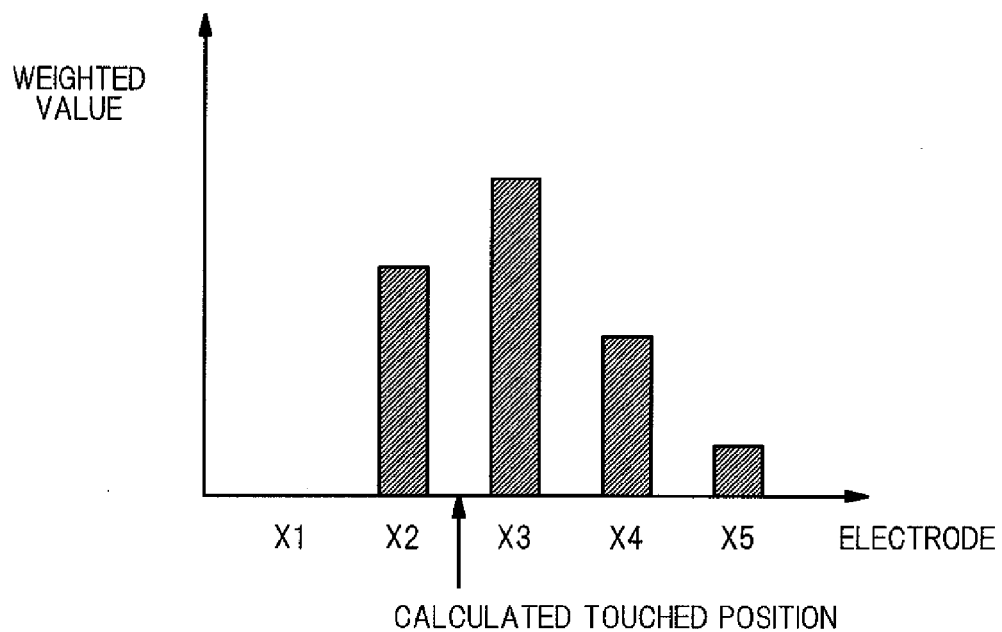
FIG. 6 is a graph showing an example of a weighted value.

FIG. 6 is a graph showing an example of the weighted value 48.

Figure 7:
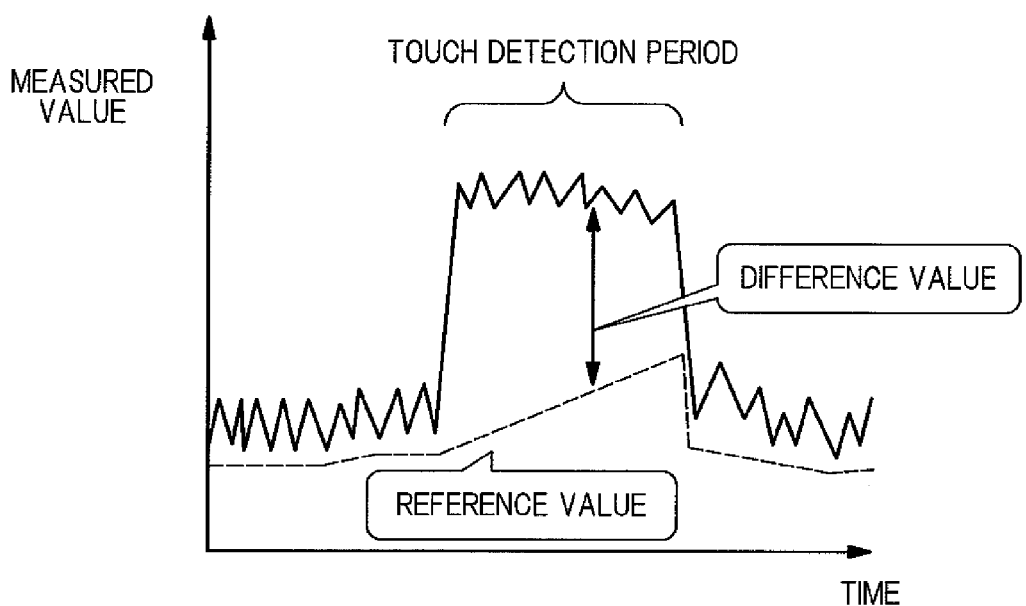
FIG. 7 is a graph showing an example of an update process for updating a reference value.

FIG. 7 is a graph showing an example of an update process for updating the reference value 45.

Figure 8:
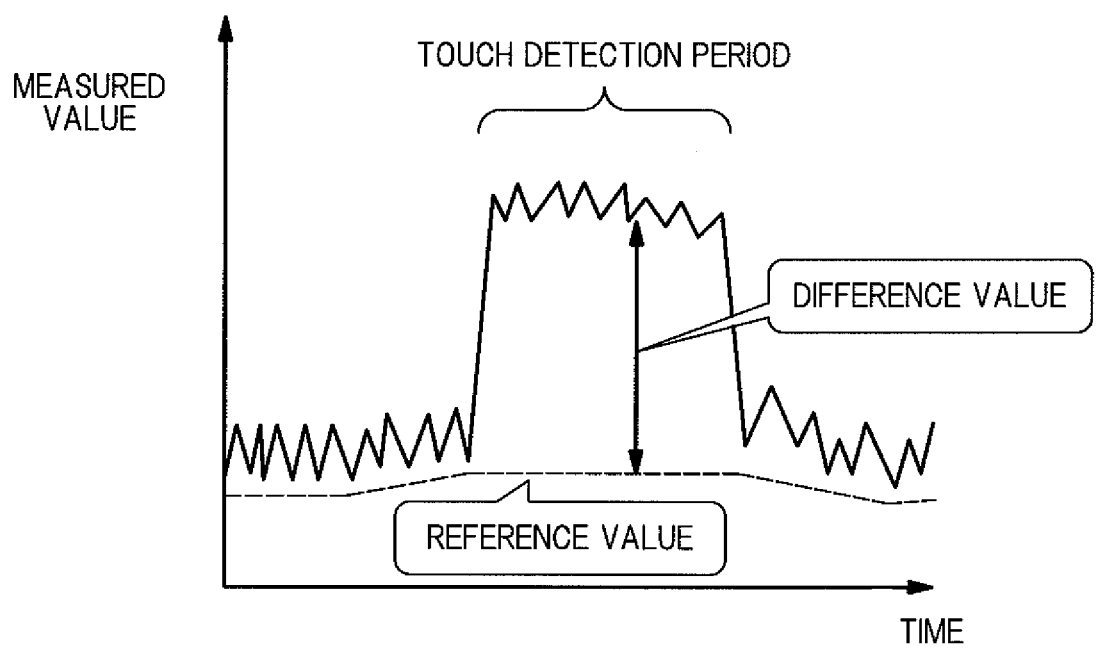
FIG. 8 is a graph showing an example of an update process for updating a reference value.

FIG. 8 is a graph showing an example of an update process for updating the reference value 45.

In the following, a flow of a process for detecting a touched position will be described, based on the flowchart shown in FIG. 3. Here, touched position detection in the X axis, utilizing the electrode X1 to X5 will be mainly described. A similar process to that for the X axis detection may be carried out for touched position detection in the Y axis, utilizing the electrodes Y1 to Y5.

When power supply for the touch panel module is turned on, the following process begins.

At step S1, the control unit 2 initializes the reference value 45. Specifically, static capacitance of each of the electrodes X1 to X5 is measured, and stored as a reference value 45 of the electrode. It is assumed here that the touch panel 1 is not touched when the power supply is turned on.

At step S2, the control unit 2 measures static capacitance of each of the electrodes X1 to X5, and stores a measured value as a measured value 46 of the electrode. Thereafter, a value obtained by the expression (1) below is stored as a difference value 47.

$$\text{difference value 47} = \text{measured value 46} - \text{reference value 45} \quad (1)$$

Note that for a negative difference value 47, 0 is stored instead of the obtained value.

In the following, an example with the difference values 47 obtained being those shown in FIG. 4 will be described.

At step S3, the control unit 2 determines whether or not the touch panel 1 is touched. Specifically, whether or not a difference value 47 of a respective electrode X1 to X5 is equal to or more than a predetermined touch threshold 41 is determined. When a difference value 47 of at least one electrode is equal to or larger than the touch threshold 41, presence of a touch is determined, and the process proceeds to step S4. Meanwhile, when this condition is not satisfied, absence of a touch is determined, and the process proceeds to step S7. With the case shown in FIG. 4, as the difference value 47 of the electrode X3 is larger than the touch threshold 41, presence of a touch is determined.

At step S4, the control unit 2 determines a near-peak electrode. Specifically, difference values 47 of the electrodes X1 to X5 are compared to one another to define the one having the highest difference value 47 as a peak electrode. In the case shown in FIG. 4, the electrode X3 is defined as a peak electrode. Thereafter, the n number of electrodes located on the right and left respective sides of the peak electrode as the center are defined as near-peak electrodes, with n being a predetermined parameter (a near-peak range 42). It is assumed that n is 1 (n=1) in this embodiment. Accordingly, the electrodes X2 to X4 are defined as near-peak electrodes, as shown in FIG. 5.

At step S5, the control unit 2 obtains a weighted value 48 for a respective electrode X1 to X5. For a near-peak electrode defined at S4, a value obtained by the expression (2) is stored as a weighted value 48; for other electrodes, a value obtained by the expression (3) is stored as a weighted value 48.

$$\text{weighted value 48} = \text{difference value 47} - \text{near-peak offset value 43} \quad (2)$$

$$\text{weighted value 48} = \text{difference value 47} - \text{non-near-peak offset value 44} \quad (3)$$

Note that for a negative weighted value 48 obtained by the expression (2) or (3), 0 is stored instead of the obtained value.

It should be noted that the near-peak offset value 43 and the non-near-peak offset value 44 are predetermined parameters having the relationship expressed by the expression (4) below.

$$\text{near-peak offset value 43} < \text{non-near-peak offset value 44} \quad (4)$$

The shadowed portions of the bars representative of the difference values 47 shown in FIG. 5 correspond to weighted values 48, and the portions corresponding to the weighted values 48 are separately shown in the form of a graph in FIG. 6.

At step S6, the control unit 2 calculates a touched position. That is, a calculation process is carried out, based on the positions of the respective electrodes in the touch panel 1 and the weighted values 48 calculated at step S5. FIG. 6 shows an example of a calculated touched position (between the electrode X2 and the electrode X3).

At step S7, the control unit 2 updates the reference values 45 of the respective electrodes. Specifically, a calculation process is carried out, based on the current reference value 45 and the measured value 46 stored at step S2. Various methods are available for the calculation process. In the example shown in FIG. 7, a reference value 45 follows with delay a shifting measured value 46. This method, however, has a problem that, during a period with a touch detected, the signal level of the difference value 47 gradually decreases. This will deteriorate accuracy of touched position detection. To address the phenomenon, the following process is carried out in this embodiment. Specifically, when a touch is not detected at step S3, reference values 45 of all electrodes are updated. When a touch is detected, on the other hand, a reference value 45 of only an electrode other than a near-peak electrode is updated, while that of a near-peak electrode is not (FIG. 8).

With the above, one cycle of a touched position detection process is completed, with the process thereafter returning to step S2.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A touched position detection method for a touch panel for detecting a touched position, based on measured values by a plurality of sensors, comprising:

a step of selecting sensors located in a vicinity of a sensor showing a measured value higher than a predetermined level; and a step of applying a first noise reduction parameter to measured values by the selected sensors and applying a second noise reduction parameter which is different from the first noise reduction parameter to measured values by other sensors having a measured value lower than the measured value of the selected sensors, wherein the first and second noise reduction parameters are respectively predetermined values to be subtracted from a measured value by a sensor to be referred to in a touched position calculation process.

2. The touched position detection method for a touch panel according to claim 1, wherein
the sensors are electrodes of which static capacitance is able to be measured, and
the measured values are values indicating static capacitance.

3. The touched position detection method for a touch panel according to claim 1, wherein the selected sensors are a set of sensors located within a predetermined distance from the sensor showing a high measured value.

4. A touched position detection method for a touch panel for detecting a touched position, based on current measured values by sensors and reference values which are measured values by sensors with absence of a touch, comprising:
a step of selecting sensors located in a vicinity of a sensor showing a measured value higher than a predetermined level, wherein content of an update process for updating the reference values is controlled depending on whether or not sensors of concern are included in the selected sensors and,
a step of applying a first noise reduction parameter to measured values by the selected sensors and applying a second noise reduction parameter which is different from the first noise reduction parameter to measured values by other sensors having a measured value lower than the measured value of the selected sensors,
wherein the first and second noise reduction parameters are respectively predetermined values to be subtracted from a measured value by a sensor to be referred to in a touched position calculation process.

5. The touched position detection method for a touch panel according to claim 4, wherein
the sensors are electrodes of which static capacitance is able to be measured, and
the measured values are values indicating static capacitance.

6. The touched position detection method for a touch panel according to claim 4, wherein the selected sensors are a set of sensors located within a predetermined distance from the sensor showing a measured value higher than a predetermined level.

* * * * *